Aug. 28, 1928.
C. T. PFLUEGER
1,682,709
FISHING REEL
Filed June 19, 1924
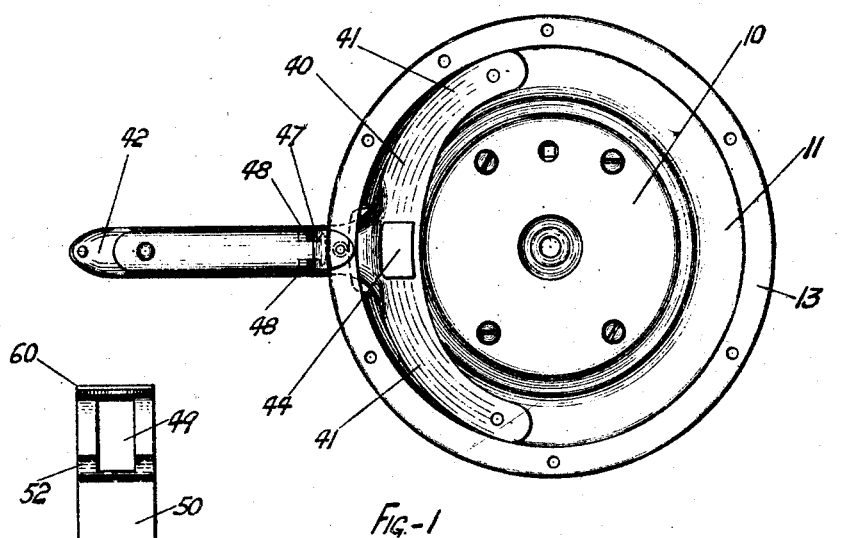
Fig.-1
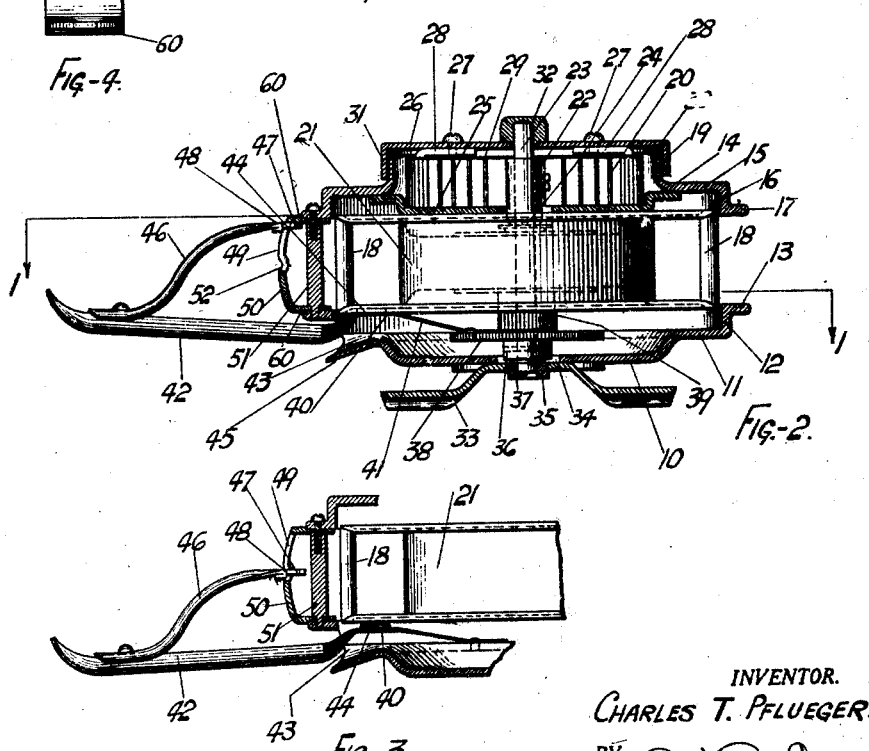
INVENTOR.
CHARLES T. PFLUEGER.
BY
ATTORNEY.

Patented Aug. 28, 1923.

1,682,709

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

FISHING REEL.

Application filed June 19, 1924. Serial No. 720,900.

This invention relates to fishing reels and particularly to automatic fishing reels which are usually operated by coil springs.

The purpose of the invention is to provide an improved form of brake-mechanism for controlling the operation of the spool under the action of the spring. In particular the invention is directed to an improved form of brake release whereby the action of the spring on the spool may be made intermittent and for shorter or longer intervals at the desire of the operator and whereby it also may be made continuous by locking the brake in released position.

In devices of the character described, as heretofore constructed, the brake controlling devices have tended to foul the line and accordingly as one of the important objects of the invention a structure is contemplated whereby the line cannot become so fouled in the brake controlling devices.

The above and other objects will become apparent as the following detailed description is read in connection with the accompanying drawings, it being understood that the claims are not wholly limited to the specific structure shown and described.

Of the drawings:

Figure 1 is a section on line 1—1 of Figure 2;

Figure 2 is a diametrical section through an automatic reel constructed according to the invention and showing the brake control in active position;

Figure 3 is a detail view showing the brake control in release position; and

Figure 4 is a detail showing the arc-shaped locking member.

Referring to the drawings, 10 represents a back plate formed with a circumferential shoulder 11, a circumferential flange 12 perpendicular to the shoulder 11 and a circumferential flange 13 extending from the top of the flange 12 and parallel to the shoulder 11. The numeral 14 indicates a front plate having a shoulder 15 corresponding to the shoulder 11, a flange 16 corresponding to the flange 12 and a flange 17 corresponding to the flange 13. Flanges 13 and 17 are connected by pillars 18, 18 to form a reel cage.

The plate 14 is formed with a central aperture defined by a flange 19, perpendicular to the shoulder 15, the flange 19 forming a part of a housing for a coil spring 20 by which a spool 21 is adapted to be automatically actuated. The spring 20 is secured at the center to a sleeve 22 journaled on a shaft 23 on which is also journaled the spool 21, the sleeve 22 and the shaft 23 having suitable interlocking means thereon as indicated at 24 whereby rotation of the sleeve 22 by the spring 20 will cause rotation of the shaft. As the present invention is not directed to this means it will not be necessary to describe the particular means employed for this purpose.

The outer end of the spring 20 is connected to a ratchet 25 which may be controlled by a suitable pawl arrangement (not shown) mounted on the shoulder 15 and adapted to engage the ratchet 25 to prevent unwinding of the spring, as will be understood. The spring is adapted to be wound by a cap plate 26 which is connected to the ratchet 25 by screws 27, 27 engaged in threaded apertures in a plurality of lugs 28, 28 formed on the ratchet 25 so as to extend outwardly therefrom and bent to substantially L-shape about the spring, a thin brass disc 29 being interposed between the lugs 28 and the spring. The cap plate 26 is adapted to seat on the flange 19, brass wear washer 30 preferably being secured in the cap plate so as to ride on the edge of flange 19. The cap plate 26 is also formed with a circumferential flange 31 adapted to encircle the flange 19, the outer surface of flange 31 being preferably roughened (not shown) to facilitate turning thereof by hand. The cap plate 26 is journaled on one end of the shaft 23, a suitable bearing 32 being secured in the center of the cap plate for this purpose.

The back plate 10 has a bracket 33 secured thereon which latter is employed to secure the reel on a rod as will be understood. The bracket 33 is secured on the plate 10 over a central aperture 34 in the latter, the bracket 33 being provided with a bearing 35 in which is journaled the other end of the shaft 23, a collar 36 being secured on the shaft to hold the latter in place in the bearing 35, and a wear washer 37 being interposed between the collar 36 and the bearing. The shaft 23 has a gear 38 secured thereon and adapted to drive gears (not shown) eccentrically supported on the back plate which latter are adapted to drive a gear 39 secured to the spool 21 whereby rotation of the shaft 23 will be transmitted to the spool 21 by a train of gearing adapted to multiply the rotation of shaft 23 any desired amount to be determined by the size of the gears.

The present invention is directed to a brake control device for the spool 21, which device will now be described. This device includes a substantially Y-shaped strip of resilient metal 40 secured at the outer ends of the arms 41, 41 onto the shoulder 11, the arms 41 of the Y being arced so as substantially to follow the surface of the shoulder 11. The leg 42 of the Y extends through an aperture 43 stamped through the side of the plate 10, the metal of the leg being curved, as shown, to impart strength thereto, the leg 42 being in effect, a brake control lever. On the surface of strip 40 adjacent the spool 21 is a strip of friction material 44, such as leather, which material is adapted normally to be pressed tightly against the outer surface of one of the flanges of the spool 21 by the strip 40.

The leg or lever 42 is adapted to be pressed inwardly toward the finishing rod by comparatively slight pressure of the fingers due to the leverage thereon, to urge the brake 44 away from the spool to permit rotation thereof, a partly stamped out portion of the plate 10, as indicated at 45, being adapted to limit movement of the lever 42 inwardly. The lever 42 is adapted to be locked in brake-release position by means of a latch comprising a goose-neck strip 46 of transversely curved resilient sheet metal which is secured at one end to the lever 42 adjacent its end and at the other end is formed with a transversely slotted tongue 47 defined by shoulders 48, 48 formed on the strip. The tongue 47 is engaged in an elongated slot 49 in an outwardly arced member 50 (see Figure 4) which latter is secured between plates 10 and 14 by a pillar 51. The ends of the member 50 are recessed as at 60 and seat against the flange 13 and 17 so as to prevent displacement of the members. The slot 49 is of substantially uniform width and at its inner end (the end adjacent the rod) a transverse groove 52 is formed in the member 50 into which the shoulders 48 are adapted to seat in one position of the strip 46, as shown in Figure 3, to hold the brake lever 42 and brake 44 in released position.

Assuming the brake to be engaged with the spool 21 and the spring 20 to be under tension, the brake-device may then be operated in various ways. For example, if it be desired to merely draw up a little slack, pressure will be applied to the end of lever 42 to temporarily release the brake. As soon as this pressure is removed the brake will again engage and stop the spool. No amount of pressure on the end of lever 42 will cause the shoulders 48 to engage in the groove 52 for the reason that the strip 46 is resilient and will be prevented from movement into the slot by the action of the arced member 15 on the shoulders 48.

Should it be desired to lock the brake in released position as when playing a fish so as to keep the tension of the spring on the fish at all times, the latch 46 is engaged by the fingers and pressed until the shoulders 48 engage in the groove 52, as shown in Figure 3, whereupon the lever 42 will be locked in the release position and there remain until unlocked by the operator. To unlock the lever 42 slight pressure is exerted on the outer end thereof whereupon the shoulders 48 will be disengaged from the groove 52 due to the resilience of strip 46 which will spring outwardly.

It is to be noted that the brake locking device is entirely outside of the cage of the reel and that it is thus prevented from fouling the line, the post 51, moreover, acting as a guard absolutely to prevent entangling of the line in the locking device.

From the foregoing description it will appear that the objects of the invention have been realized in a simple but efficient device for easily and readily controlling the automatic operation of the spool and without any danger of fouling or entangling the line on any parts of the reel structure or control device. The strip 46 operates as a brace for the outer end of the lever 42. It will also appear that modifications of the invention may be resorted to without departing from the spirit thereof or from the scope of the appended claims.

What I claim is:

1. In a device of the class described, a brake, a brake operating lever, a latch secured to the lever and adapted when pressure is applied thereto to move the lever to one position and to lock it therein, said latch being adapted upon further movement of the lever to release the latter for movement to another position.

2. In an automatic fishing reel, a reel structure, a rotary spool therein, a brake, a brake operating lever attached to the reel structure and extending outwardly therefrom, a latch secured to the lever near the outer extremity thereof and extending toward the reel structure whereby pressure may be applied to the latch to depress the lever, and a keeper on the reel structure with which the free end of the latch is engageable.

3. In an automatic fishing reel, a reel structure, a rotary spool therein, a resilient brake lever attached to the reel structure and normally bearing against the spool, the end of the lever extending outwardly of the reel structure, a latch attached at one end near the extremity of the lever and lying over the same so that the lever may be depressed by pressure applied to the latch, and a keeper on the reel for retaining the latch.

4. In an automatic fishing reel, a rotary spool, a brake, a lever normally urging the brake toward the spool, a latch on said lever one end of which is normally urged away from said lever, an arc-shaped member engageable with said end of said latch, said member having a groove into which the end of the latch is adapted to seat when said end is moved relatively to said lever.

5. In an automatic fishing reel, a rotary spool, a brake, a lever normally urging the brake toward the spool, a latch pivoted on said lever the other end of said latch being free and normally urged away from the lever, and a keeper engaged by the free end of the latch, said member having a groove therein in which the free end of the latch is adapted to seat.

6. In an automatic fishing reel, a rotary spool, a brake, a lever normally urging the brake toward the spool, a latch comprising a strip of resilient material one end of which is secured on the lever at a point remote from the reel and the other end of which is free and spaced therefrom, and means engageable with the free end of the strip for locking the lever in a brake release position when the strip is depressed toward the lever.

7. In an automatic fishing reel, a rotary spool, a brake, a lever normally urging the brake toward the spool, a latch comprising a strip of spring metal formed as a goose neck one end of which is connected to said lever, a tongue on the other end of said strip said tongue being defined by shoulders, and an arc-shaped member having a slot in which said tongue is engaged, said member having a groove therein in which said shoulders are adapted to seat to lock said lever in a brake-release position.

8. An automatic fishing reel comprising a reel structure, a rotary spool therein, a brake, a lever normally urging the brake in contact with the spool, a latch attached to the brake lever, a keeper for the latch comprising a plate attached to the reel structure, the plate having a detent for the latch, and interengaging means between the plate and the reel structure to prevent rotation of the plate.

9. An automatic fishing reel comprising a reel structure, a rotary spool therein, a brake, a lever normally urging the brake in contact with the spool, a latch attached to the brake lever, and a keeper for the latch comprising a plate attached to the reel structure, the plate having a detent for the latch and recesses adapted to fit the reel structure to prevent rotation of the plate.

CHARLES T. PFLUEGER.